United States Patent
Ogasawara

(10) Patent No.: US 7,209,944 B2
(45) Date of Patent: Apr. 24, 2007

(54) SYSTEM AND METHOD FOR PROVIDING INFORMATION, AND RECORDING MEDIUM

(75) Inventor: Satoshi Ogasawara, Saitama (JP)

(73) Assignee: Casio Computer Co., Ltd., Tokyo (JP)

( * ) Notice: Subject to any disclaimer, the term of this patent is extended or adjusted under 35 U.S.C. 154(b) by 535 days.

(21) Appl. No.: 09/957,284

(22) Filed: Sep. 20, 2001

(65) Prior Publication Data

US 2002/0038354 A1     Mar. 28, 2002

(30) Foreign Application Priority Data

Sep. 27, 2000   (JP) ............................. 2000-293387

(51) Int. Cl.
    *G06F 15/16*   (2006.01)
(52) U.S. Cl. .................................... 709/203; 709/206
(58) Field of Classification Search ........ 709/200–207, 709/217–220, 223, 227, 229, 238, 248; 705/51–53, 705/57, 400
    See application file for complete search history.

(56) References Cited

U.S. PATENT DOCUMENTS

| | | | | |
|---|---|---|---|---|
| 5,697,793 A | * | 12/1997 | Huffman et al. | 434/317 |
| 6,085,226 A | * | 7/2000 | Horvitz | 709/203 |
| 6,385,614 B1 | * | 5/2002 | Vellandi | 707/9 |
| 6,460,038 B1 | * | 10/2002 | Khan et al. | 707/10 |
| 6,463,466 B1 | * | 10/2002 | Weyer | 709/217 |
| 6,499,052 B1 | * | 12/2002 | Hoang et al. | 709/203 |
| 6,516,337 B1 | * | 2/2003 | Tripp et al. | 709/202 |
| 6,546,393 B1 | * | 4/2003 | Khan | 707/10 |
| 6,571,054 B1 | * | 5/2003 | Tonomura et al. | 386/95 |
| 6,832,222 B1 | * | 12/2004 | Zimowski | 707/9 |
| 2003/0061275 A1 | * | 3/2003 | Brown et al. | 709/203 |

FOREIGN PATENT DOCUMENTS

JP        2000-155766        6/2000

* cited by examiner

*Primary Examiner*—Bharat Barot
*Assistant Examiner*—Asad M. Nawaz
(74) *Attorney, Agent, or Firm*—Frishauf, Holtz, Goodman & Chick, P.C.

(57) ABSTRACT

To provide a system and a method for providing information and a recording medium, by which communications cost and network traffic are reduced in a system which provides a plurality of pages including successive contents via a communication network. A story provider site 100 generates user ID for identifying a reader terminal 300 and reader information which includes information representing a last page, and transmits web page data segments based on the reader information together with the user ID to the reader terminal 300 concerned. The reader terminal 300 requests the pages with transmitting the user ID. The story provider site 100 transmits web page data segments based on the reader information corresponding to the returned user ID. The story provider site 100 updates the reader information based on the transmitted web page.

10 Claims, 12 Drawing Sheets

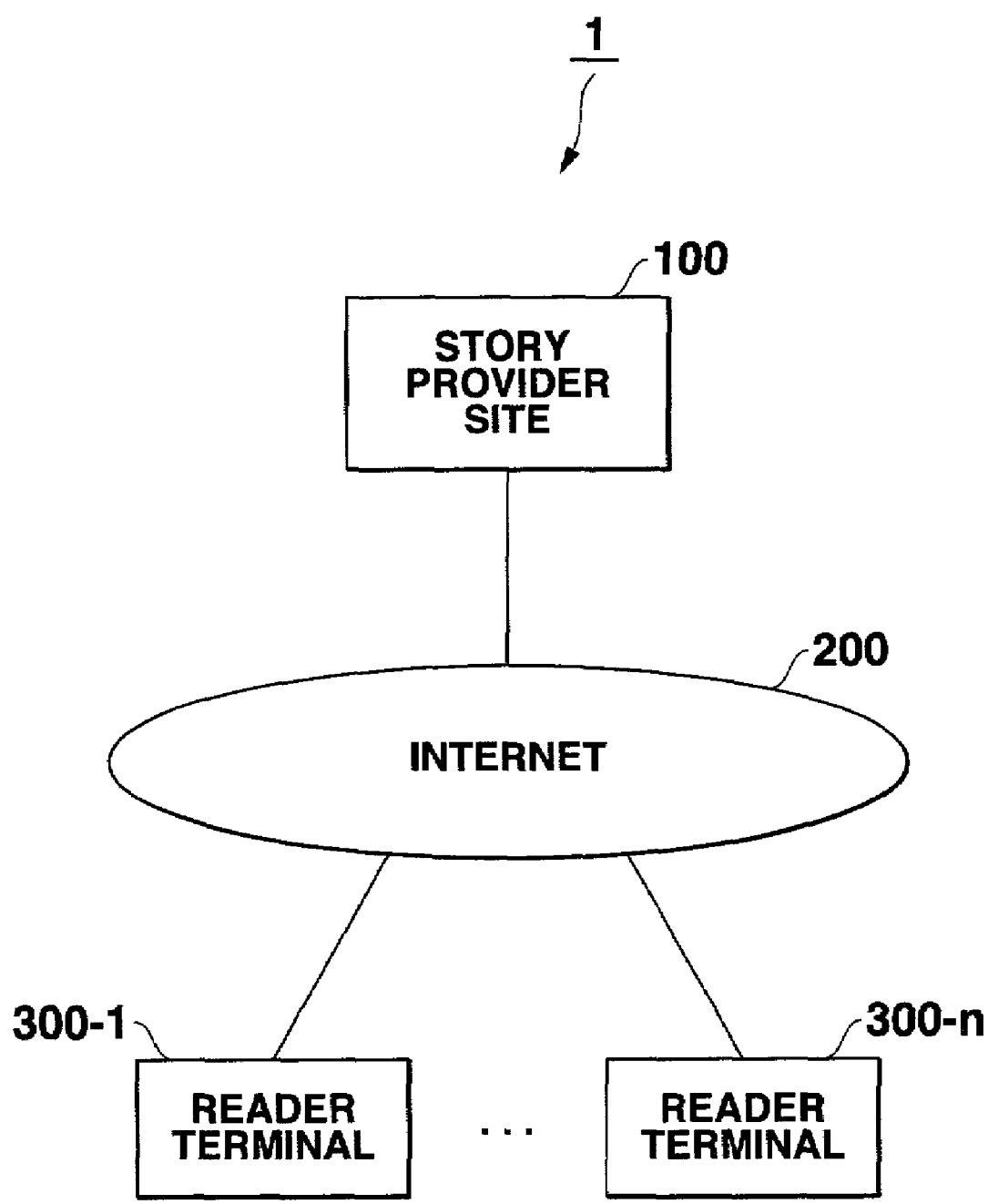

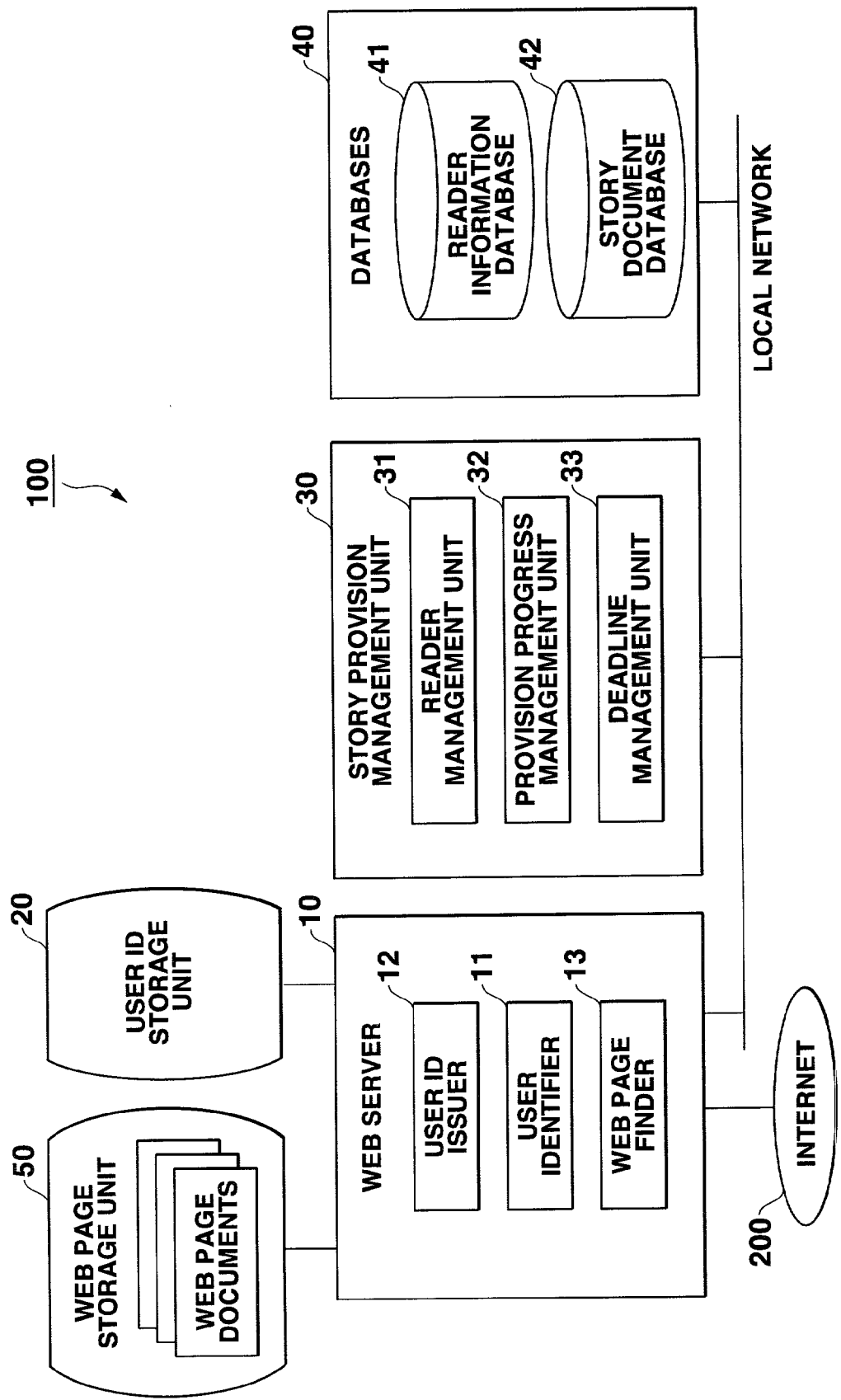

FIG.3A

READER INFORMATION FILE

| USER ID | LAST PAGE | CONTINUATION PAGE | BOOKMARK FLAG | REPEAT FLAG | SESSION TERMINATION |
|---|---|---|---|---|---|
| | | | | | |
| | | | | | |
| . . . | . . . | . . . | . . . | . . . | . . . |

FIG.3B

STORY FILE TABLE

| FILE NAME OF STORY PAGE | | | |
|---|---|---|---|
| | | | |
| | | | |
| . . . | | | |

SYSTEM AND METHOD FOR PROVIDING INFORMATION, AND RECORDING MEDIUM

BACKGROUND OF THE INVENTION

1. Field of the Invention

The present invention relates to a system and a method for providing information and a recording medium, suitable for providing contents of readings via communications networks.

2. Description of the Related Art

There are services for providing the contents of readings such as novels and serial columns to terminals (such as personal computers) via communications networks such as the Internet. Users of the terminals (that is, readers) operate web browser to establish sessions with the service provider's server for obtaining desired HTML based web pages representing the contents of the readings.

The readers must establish plural sessions when obtaining a full-length novel, because it requires much data. In case of providing serial column or novel, the story may be divided into plural sections, and those are uploaded one after another constantly. The readers also require plural sessions to obtain the contents of such the readings because it is impossible to download all sections at once.

Such the services generally provide the readers with index pages at beginning of each session. The index page may list indexes of available contents. In case of full-length novel, for example, the index page may list indexes of chapters, and a reader selects a chapter which follows to a chapter he/she read last time. The readers intend to forget which was the last chapter when he/she continues reading for the first time in a long while. Under such the situation, the service providers generally provide all pages at each session. It is helpful for avoiding the above problem, but increases connection time for downloading the pages. Thus, it increases network traffic and the readers' telecommunication costs.

SUMMARY OF THE INVENTION

A first aspect of the present invention features a system for providing information being connected to a communications network, which selectively provides web page data segments representing a plurality of pages which include successive description via the communications network, in accordance with web page data segments provided last time.

The System Comprises:

a web page storage unit which stores the web page data segments;

an ID information managing unit which receives a request for the web pages, generates ID information for identifying the source of the request and additional information representing a last page represented by the web page data segment which has been transmitted to the request source, and stores the generated ID information and additional information so that the ID information and additional information are associated with each other;

a web page providing unit which retrieves the web page data segments corresponding to the additional information from the web page storage unit, and transmits the retrieved web page data segments to the request source together with the corresponding ID information;

a provision progress managing unit which updates the additional information if the web page providing unit transmits the web page data segments; and an ID information receiver which receives the ID information returned from the request source.

In this case, the web page providing unit further transmits the web page data segments based on the additional information corresponding to the ID information received by the ID information receiver, that is, the web page providing unit provides the web pages corresponding to the reader's reading progress.

A second aspect of the present invention features a method for providing information by which an information providing apparatus selectively provides a plurality of terminals with web page data segments representing a plurality of pages including successive description, in accordance with web page data segments provided last time.

The Method Comprises the Steps of:

generating ID information for identifying the terminal in response to request for providing web pages from the terminal, and of generating additional information representing a last page represented by the web page data segments which has been provided to the terminal;

transmitting web page data segments corresponding to the additional information together with the corresponding ID information to the terminal which requested the web pages; and receiving the ID information from the terminal together with the page request;

transmitting web page data segments to the terminal based on the additional information corresponding to the received ID information.

The method further updates the additional information in a case where the web page data segments representing a page corresponding to the additional information are transmitted to the terminal, and/or in a case where the web page data segments representing pages following to the page corresponding to the additional information are transmitted to the terminal. Thus, the web pages are provided to the terminal in accordance with the reader's reading progress.

A third aspect of the present invention features a system for providing information which comprises an information providing apparatus being connected to a communications network, and a plurality of terminals each of which receives web page data segments representing a plurality of pages including successive description from the apparatus via the communications network, wherein the terminal may comprise:

a web page browser which receives web page data segments and ID information for identifying the terminal from the information providing apparatus, and outputs the received web page data segments; and an additional information generator which generates additional information which designates a last page of the pages output by the web page browser, and transmits the generated additional information to the information providing apparatus together with the ID information when requesting the web pages, and the information providing apparatus may comprise:

a storage unit which stores the ID information and additional information provided by the terminal so that the ID information and additional information are associated with each other; and a transmitter which transmits the web page data segments to the terminal designated by the ID information corresponding to the additional information.

BRIEF DESCRIPTION OF THE DRAWINGS

These objects and other objects and advantages of the present invention will become more apparent upon reading of the following detailed description and the accompanying drawings in which:

FIG. 1 is a diagram schematically showing a story providing system according to an embodiment of the present invention;

FIG. 2 is a block diagram schematically showing the structure of a story provider site shown in FIG. 1;

FIG. 3A is a diagram exemplifying the contents of a reader information file in a reader information database shown in FIG. 2;

FIG. 3B is a diagram exemplifying the contents of a story file table in a story document database shown in FIG. 2;

DETAILED DESCRIPTION OF THE PREFERRED EMBODIMENT

Figure 4:
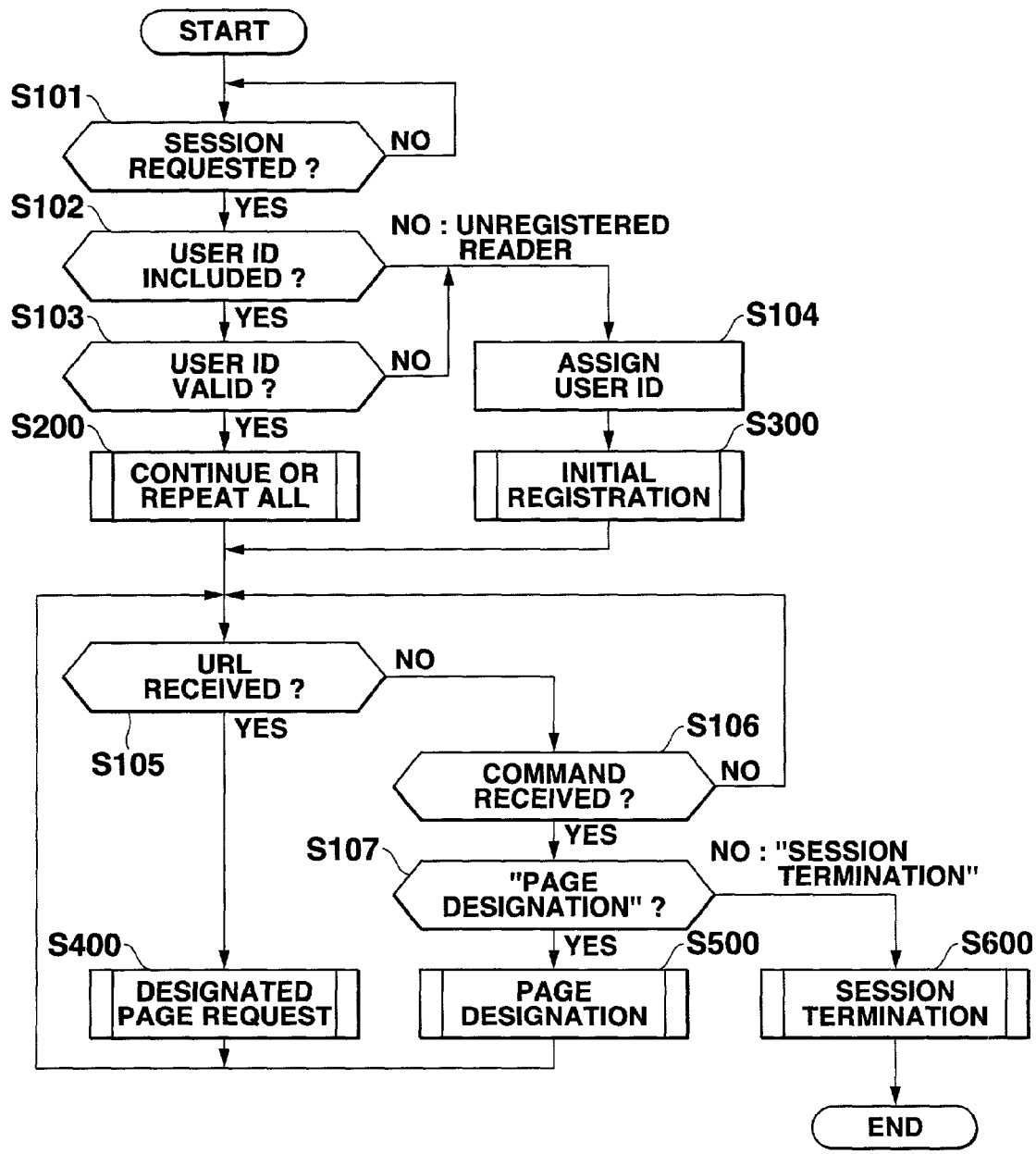
FIG. 4 is a flowchart for explaining the process carried out by the story providing system shown in FIG. 1.

An embodiment according to the present invention will now be described with reference to accompanying drawings. The following embodiment is intended to illustrate the present invention, not to limit the scope of the present invention.

FIG. 1 is a diagram schematically showing a story providing system according to the embodiment of the present invention.

A story providing system 1 according to the embodiment of the present invention comprises a story provider site 100, a communications network 200, and a plurality of reader terminals 300-1 to 300-n.

A business for story providing service according to the embodiment runs the story provider site 100 to provide text data (novels, columns, and the like) and image data (illustrations, and the like) via the communications network 200.

The communications network 200 may be the Internet which transfers the text data and the image data provided by the story provider site 100. In the present embodiment, the Internet is employed as the communications network 200, therefore, hereinafter it is referred to as Internet 200.

Each of the reader terminals 300-1 to 300-n may be a personal computer, PDA (Personal Data Assistant), a mobile phone, and/or the like which is suitable for data communications. Such the reader terminal 300 receives the text data and the image data provided by the story provider site 100 via the Internet 200, and displays information represented by the received data.

The detailed structure of the story provider site 100 will now be described with reference to FIG. 2. FIG. 2 is a block diagram schematically showing the structure of the story provider site 100.

As shown in FIG. 2, the story provider site 100 comprises a web server 10, a user ID storage unit 20, a story provision managing unit 30, databases 40, and a web page storage unit 50, which are interconnected to each other via a local network.

The web server 10 may be a data processor such as a workstation comprising at least a control unit, a memory, and a CCU (Communications Control Unit), and is a main server in the story provider site 100. The web server 1 includes a user identifier 11, a user ID issuer 12, and a web page finder 13. The control unit of the web server 10 may be a CPU (Central Processing Unit), and the memory stores programs being compatible with the interaction interface such as CGI (Common Gateway Interface). The control unit executes such the programs to activate the story provision managing unit 30 in accordance with commands given by the reader terminals 300 through the Internet 200, thus, necessary information sets are collected and processed. The control unit then creates web pages including thus collected information, and provides the web pages to the reader terminals 300 through the Internet 200.

The user identifier 11 refers to information stored in the user ID storage unit 20 to determine whether a visitor is a new comer or a registered user.

The user ID issuer 12 issues ID information (Cookie, Subscribe-ID, or the like) to the reader terminal 300 whose user is a new comer.

The web page finder 13 retrieves web pages to be transmitted to the reader terminal 300 from the web page storage unit 50. The web pages stored in the web page storage unit 50 represent the contents of the stories to be provided.

The user ID storage unit 20 may be a rewritable storage unit such as a hard disk drive, which stores information representing user ID issued by the user ID issuer 12.

The story provision managing unit 30 may be a data processor such as a workstation which includes at least a control unit and a storage unit. The story provision managing unit 30 comprises a reader managing unit 31, a provision progress managing unit 32, and a deadline managing unit 33. The story provision managing unit 30 retrieves the contents (document files) to be provided in accordance with the destination reader. The control unit of the story provision managing unit 30 executes predetermined programs being stored in the storage unit, to control the story provision managing unit 30, thus, carrying out the later described processes.

The reader managing unit 31 controls the provision progress managing unit 32 and the deadline managing unit 33 to coordinate the data in the reader information file stored in the reader information database 41.

The provision progress managing unit 32 manages data corresponding to "Last Page", "Continuation Page", "Bookmark Flag" and "Repeat Flag" in the reader information file, to coordinate story provision progress for each reader.

The deadline managing unit 33 manages information representing date and time in "Session Termination" in the reader information file, to coordinate accessible period given to each reader.

The databases 40 may be a rewritable storage units such as hard disk drives, which include the reader information database 41 and the story document database 42.

The reader information database 41 stores the reader information file. FIG. 3A shows an example of the reader information file. As shown in FIG. 3A, the reader information file includes the records corresponding to user ID issued by the user ID issuer 12. Each record includes items "Last Page", "Continuation Page", "Bookmark Flag", "Repeat Flag", and "Session Termination". "Last Page" represents file name of the web page transmitted to the corresponding reader last time (at the last session). "Continuation Page" represents file name of a web page which should be transmitted to the corresponding reader next time (at the next session). "Bookmark Flag" is a flag representing whether the corresponding reader sent "Bookmark" command (described later) at the end of the last session. "Repeat" flag is a flag representing whether the corresponding reader sent "Repeat All" command at the end of the last session. "Session Termination" represents date and time when the last session was terminated.

The story document database 42 stores story file tables prepared for each story. FIG. 3B exemplifies one of the story file tables. As shown in FIG. 3B, the story file table stores file names of files which consist web pages for one story (for example, a novel).

The web page storage unit 50 may be a rewritable storage unit such as a hard disk drive, and stores web page files representing stories (novels, columns, etc.) to be provided by the story provider site 100.

Process carried out in the story providing system 1 according to the present embodiment will now be described with reference to a flowchart shown in FIG. 4.

When the story provider site 100 receives request information requesting provision of story documents from the reader terminal 300 via the Internet 200 (step S101), the user identifier 11 determines whether the request information includes user ID issued by the user ID issuer 12 (step S102). More precisely, once the user ID issuer 12 issues user ID information (such as, cookie) to the reader terminal 300, the user ID information stays in the reader terminal 300. And the reader terminal 300 transmits the request information with the given user ID information when the reader terminal 300 accesses the story provider site 100.

If it is determined that the request information includes the user ID information, the user identifier 11 refers to the user ID information in the user ID storage unit 20 to determine whether the user ID is valid or not (step S103). In this embodiment, since the user ID information of a user whose deadline has passed will be deleted from the user ID storage unit 20 in "Deadline Management" process (described later), the user identifier 11 regards the visitor as a new comer when the received user ID information does not exist in the user ID storage unit 20.

Figure 5:
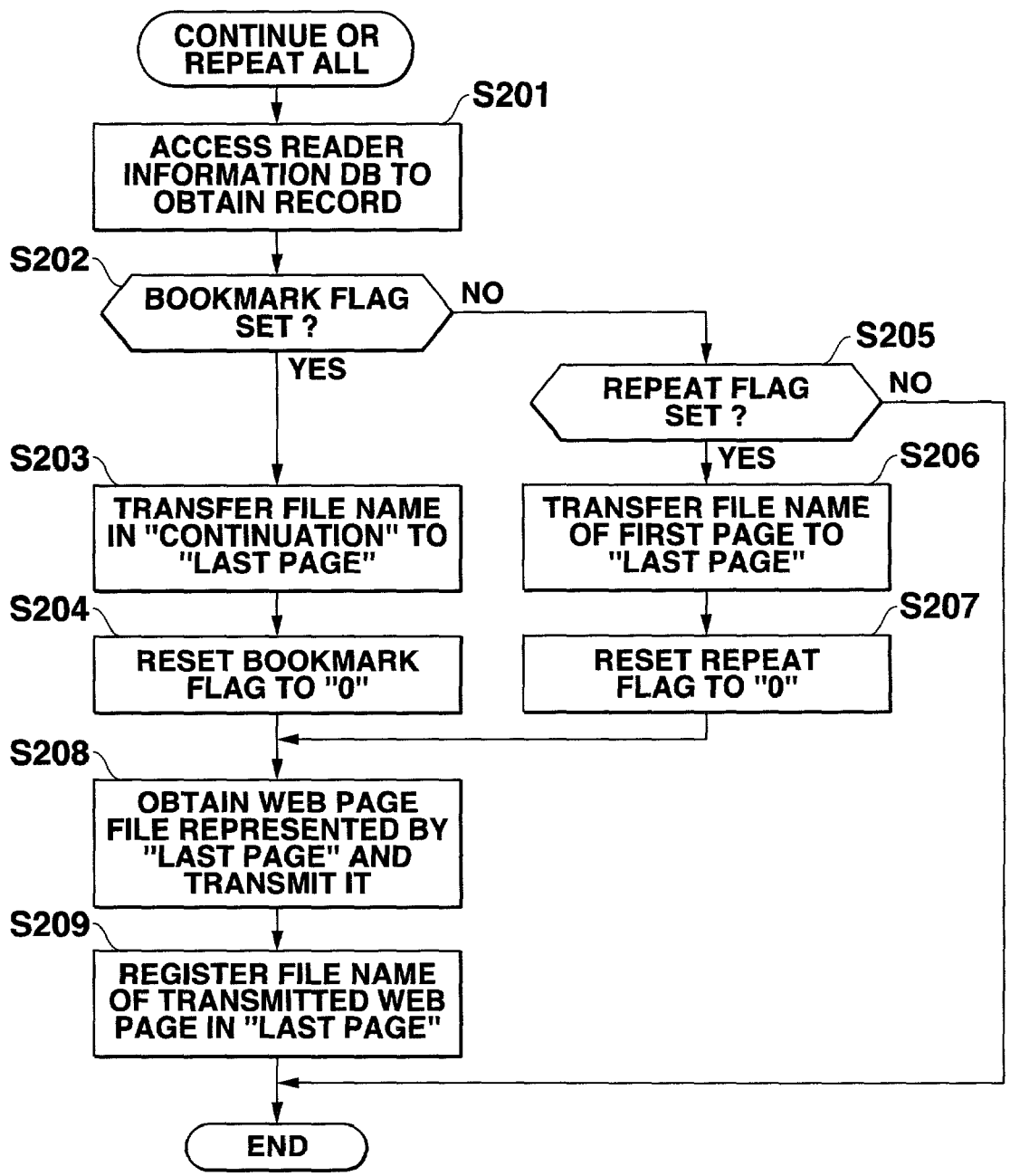
FIG. 5 is a flowchart for explaining the process for "continue or repeat all" carried out in the process flow shown in FIG. 4.

If it is determined at step S103 that the user ID is valid (step S103: Yes), the user identifier 11 recognizes that the visitor is the registered reader. In this case, the story provider site 100 carries out "Continue or Repeat All" process. The process will now be described with reference to a flowchart shown in FIG. 5.

The reader managing unit 31 accesses the reader information database 41 to read out reader information corresponding to the received user ID information (step S201).

The provision progress managing unit 32 determines whether the bookmark flag in the read-out user information is set to "1" or not (step S202). The set bookmark flag represents that the reader terminal 300 of the reader concerned sent "Bookmark" command to the story provider site 100 at the end of the last session. The "Bookmark" command represents that the reader intends to read continuous pages at the next session. In a case where the bookmark flag is "1", the provision progress managing unit 32 transfers the file name in "Last Page" to "Continuation Page" (step S203) and reset the bookmark flag to "0".

On the contrary, if it is determined at step S202 that the bookmark flag is "0", the provision progress managing unit 31 further determines whether the repeat flag is set to "1" or not (step S205). The set repeat flag represents that the reader terminal 300 of the reader concerned sent "Repeat All" command to the story provider site 100 at the end of the last session. The "Repeat All" command represents that the reader intends to read the story again from its head page at the next session. In a case where the repeat flag is "1", the provision progress managing unit 32 accesses the story document database 42 to obtain file name of the head page of the story, and stores the obtained file name in "Last Page" (step S206). And the provision progress managing unit 32 resets the repeat flag to "0" (step S207).

Then the web page finder 13 searches the web page storage unit 50 for an HTML file corresponding to the file name recorded at step S203 or S206, and obtains it. The web page finder 13 transmits the obtained HTML file to the reader terminal 300 of the reader concerned (step S208).

The reader managing unit 31 stores the file name of the web page transmitted at step S208 in "Last Page" of the reader information file in the reader information database 41 (step S209), and terminates the process.

If it is determined at step S102 that the visitor is a new comer (step S102: No), or if it is determined at step S103 that the user ID is invalid (step S103: No), the user ID issuer 12 generates user ID information and registers it in the user ID storage unit 20 (step S104). Then, the process for "Initial Registration" is carried out (step S300).

Figure 6:
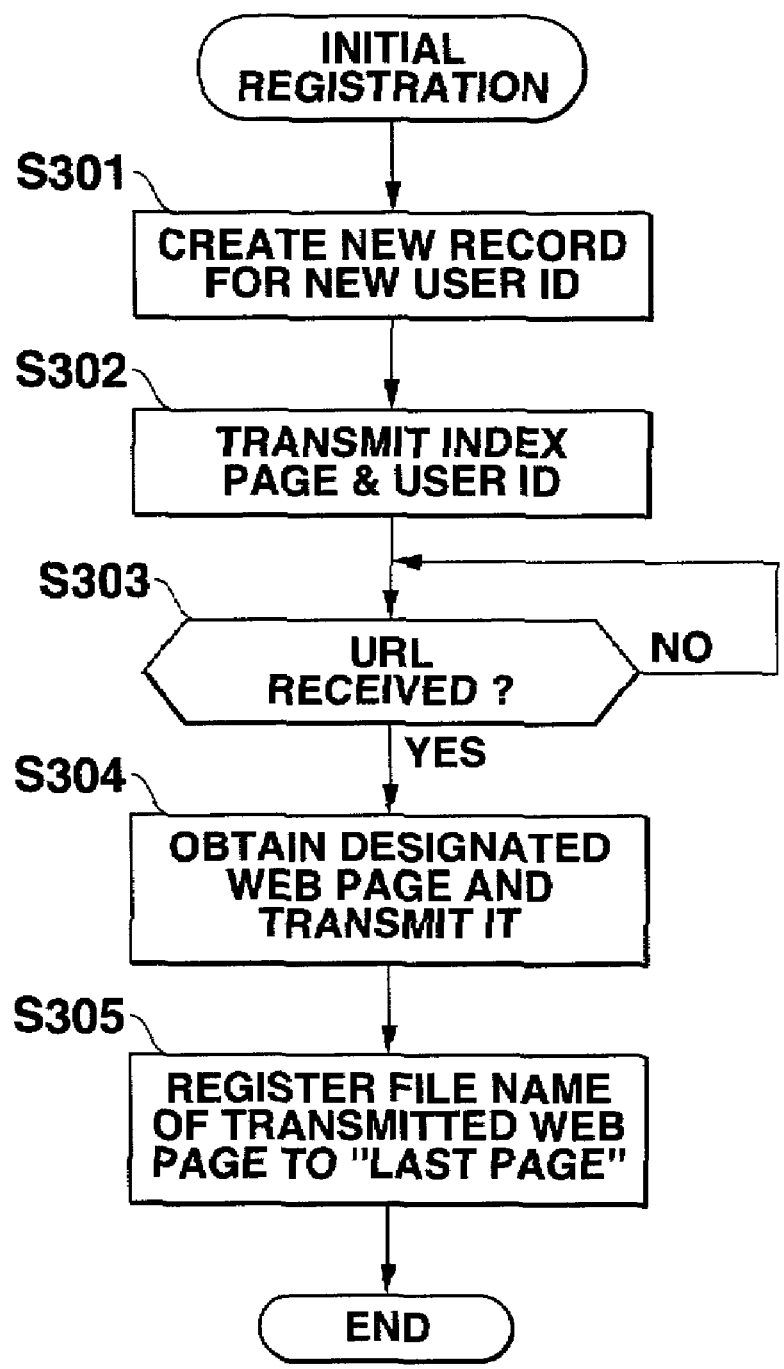
FIG. 6 is a flowchart for explaining the process for "initial registration" carried out in the process flow shown in FIG. 4.

The initial registration process will now be described with reference to a flowchart shown in FIG. 6.

The reader managing unit 31 creates a new record in the reader information file being stored in the reader information database 41 (step S301). The new record is prepared for the user ID issued at step S104.

Figure 11:
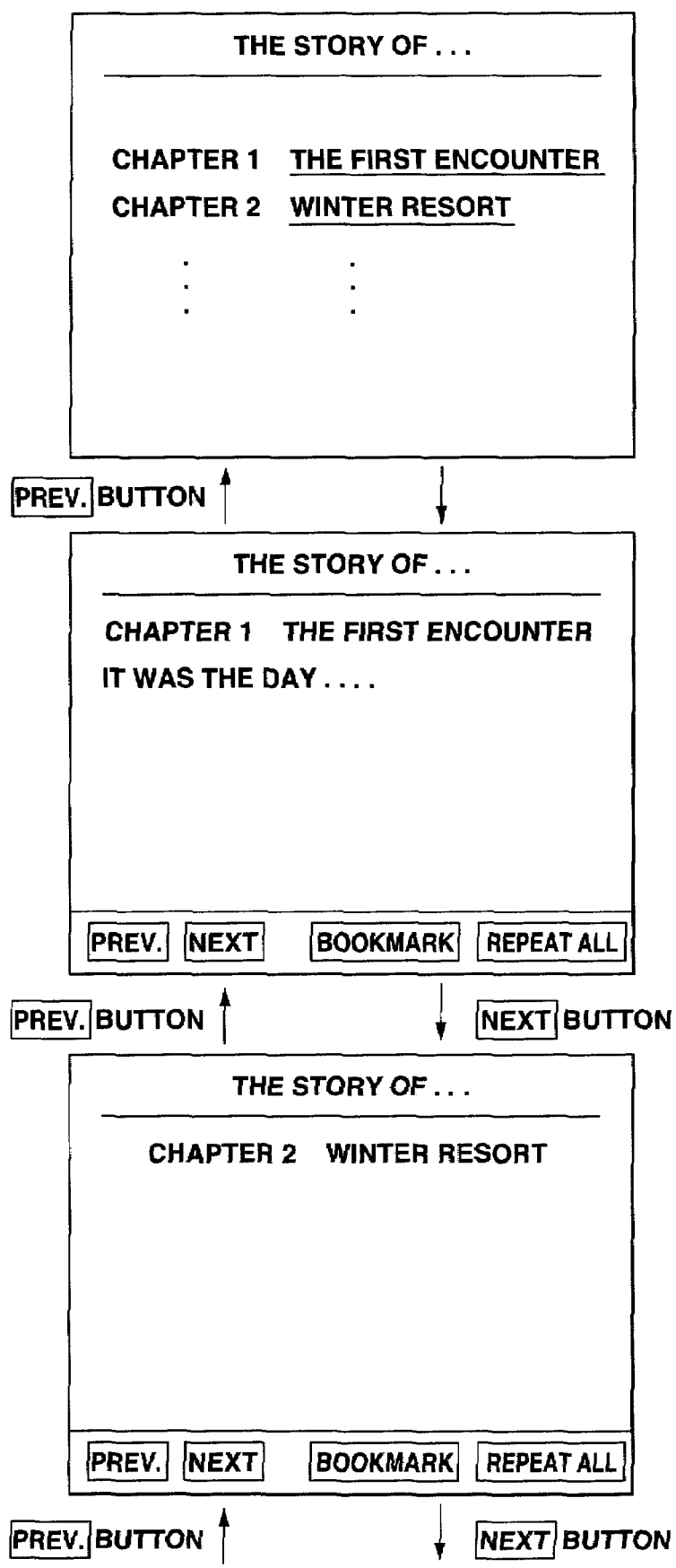
FIG. 11 is a diagram exemplifying a page to be displayed on the reader terminal shown in FIG. 1.

Then, the web page finder 13 accesses the web page storage unit 50 to retrieve an index page as shown in the upper section of FIG. 11. The index page represents a contents table of a story desired by the reader concerned. And the web page finder 13 transmits the retrieved web page together with the user ID to the reader terminal 300 (step S302). As shown in FIG. 11 (upper section), the index page includes hyperlinks representing chapters of the story. Each of the hyperlinks includes URL (Uniform Resource Locator) information invisibly. When the reader clicks on the hyperlink, the corresponding URL information is transmitted to the story provider site 100.

When the story provider site 100 receives the URL information which designates the web page desired by the reader (step S303: Yes), the web page finder 13 retrieves the web page concerned from the web page storage unit 50, and transmits it to the reader terminal 300 (step S304).

The provision progress managing unit 32 obtains information representing file name of the web page transmitted at step S304. The provision progress managing unit 32 accesses the reader information database 41 to register the file name information in "Last Page" of the reader information file (step S305), and terminates the initial registration process.

The process flow returns to the process flow shown in FIG. 4.

If the story provider site 100 receives URL information which designates a chapter desired by the reader (step S105: Yes), the story provider site 100 carries out the process for "Designated Page Request" (step S400).

Figure 7:
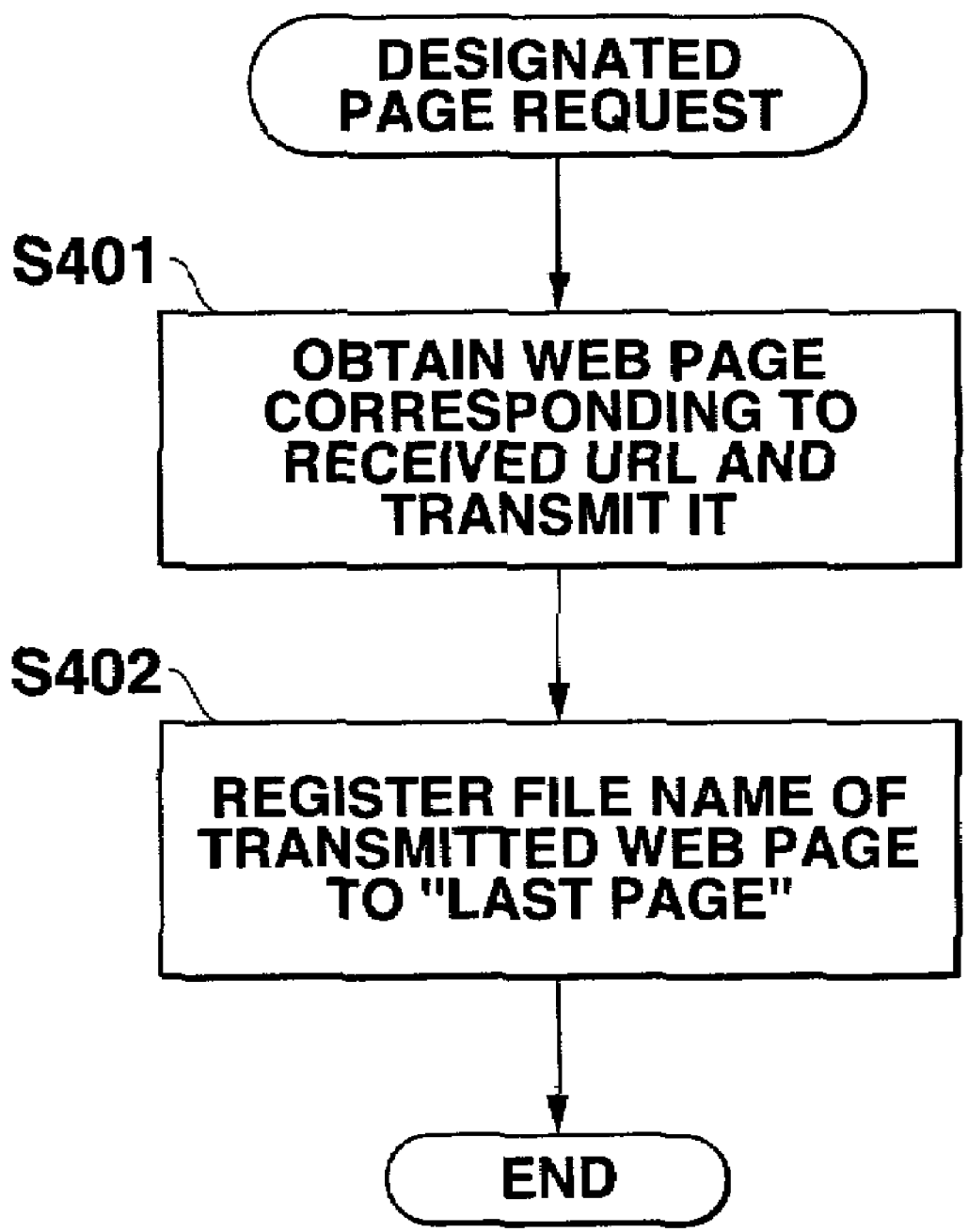
FIG. 7 is a flowchart for explaining the process for "designated page request" carried out in the process flow shown in FIG. 4.

The designated page request process will now be described with reference to a flowchart shown in FIG. 7.

The web page finder 13 retrieves a web page corresponding to the URL received at step S105, and transmits it to the reader terminal 300 (step S401).

The provision progress managing unit 32 obtains information representing file name of the web page transmitted at step S401. The provision progress managing unit 32 accesses the reader information database 41 to register the file name in "Last Page" of the reader information file (step S402), and terminates the designated page request process.

A case where the reader terminal 300 transmits a predetermined command, instead of URL for the next page (step S105: No), will now be described.

When the story providing site 100 receives a command (step S106: Yes), the provision progress managing unit 32 determines the type of the command, "Page Designation" command or a "Session Termination" command (step S107).

Figure 8:
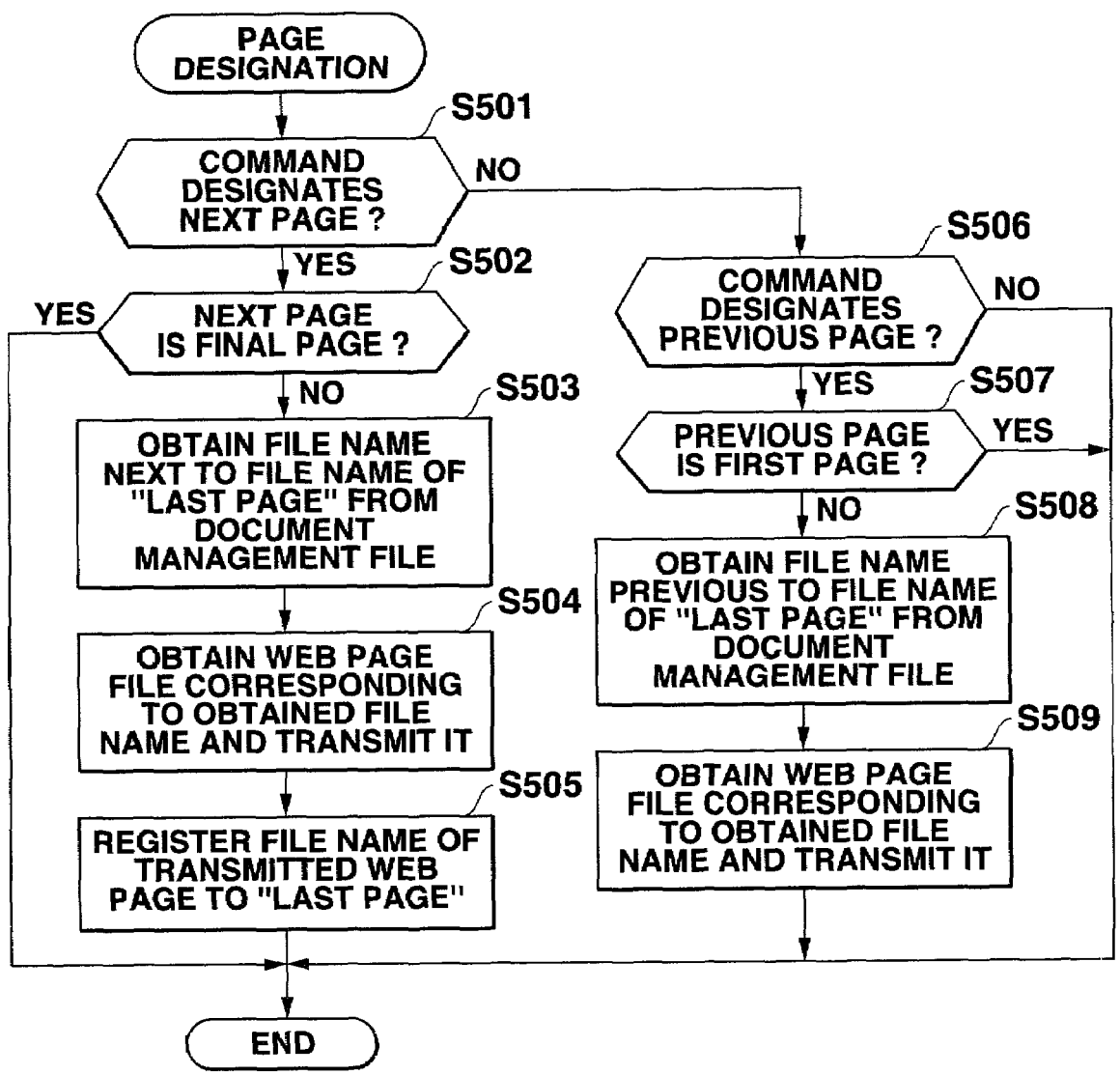
FIG. 8 is a flowchart for explaining the process for "page designation" carried out in the process flow shown in FIG. 4.

If the received command is the "Page Designation" command (step S107: Yes), the process for "Page Designation" is carried out (step S500). The page designation process will now be described with reference to a flowchart shown in FIG. 8.

The provision progress managing unit 32 determines whether the command requests the previous page or the next page (step S501). See a lower section of FIG. 11 exemplifying a web page displayed on the reader terminal 300. As illustrated, the web page has a "NEXT" button. If the user clicks on this button, the command requesting the next page is transmitted to the story provider site 100. The web page also has a "PREV." (=previous) button. Upon clicking on this button, the command requesting the previous page is transmitted to the story provider site 100. Hereinafter, the command requesting the next page will be referred to as "command N", and the command requesting the previous page will be referred to as "command P".

If the received command is the command N (step S501: Yes), the provision progress managing unit 32 accesses the story document database 42 to refer to the story file table of the story concerned, to determine whether the page provided last time ("Last Page") is the final page of the story or not (step S502).

If it is determined at step S502 that the page provided last time is the final page of the story (step S502: Yes), the provision progress managing unit 32 terminates the process because there is no page to be provided.

In a case where the page provided last time is not the final page of the story, the provision progress managing unit 32 obtains information representing file name of a page following to the page represented by the file name in "Last Page" (step S503).

The web page finder 13 retrieves a web page corresponding to the file name obtained at step S503, and transmit the retrieved web page to the reader terminal 300 (step S504).

The provision progress managing unit 32 registers the file name of the web page transmitted at step S504 in "Last Page" of the reader information file (step S505), and terminates the process.

In a case where the received command is the command P (step S506: Yes), the provision progress managing unit 32 refers to the story file table of the story concerned, to determine whether the page represented by the file name in "Last Page" is a head page of the story or not (step S507).

If it is determined that the page provided last time is the head page of the story (step S507: Yes), the provision progress managing unit 32 terminates the process, because there is no page to be provided.

In a case where the page provided last time is not the head page of the story (step S507: No), the provision progress managing unit 32 refers to the story file table to obtain information representing file name of a page previous to the page represented by the file name in "Last Page" (step S508). The web page finder 13 retrieves a web page corresponding to the obtained file name from the web page storage unit 50, and transmits the obtained web page to the reader terminal 300 (step S509). In this case, the provision progress managing unit 32 does not overwrite any information in the reader information file, and terminates the process.

Figure 9:
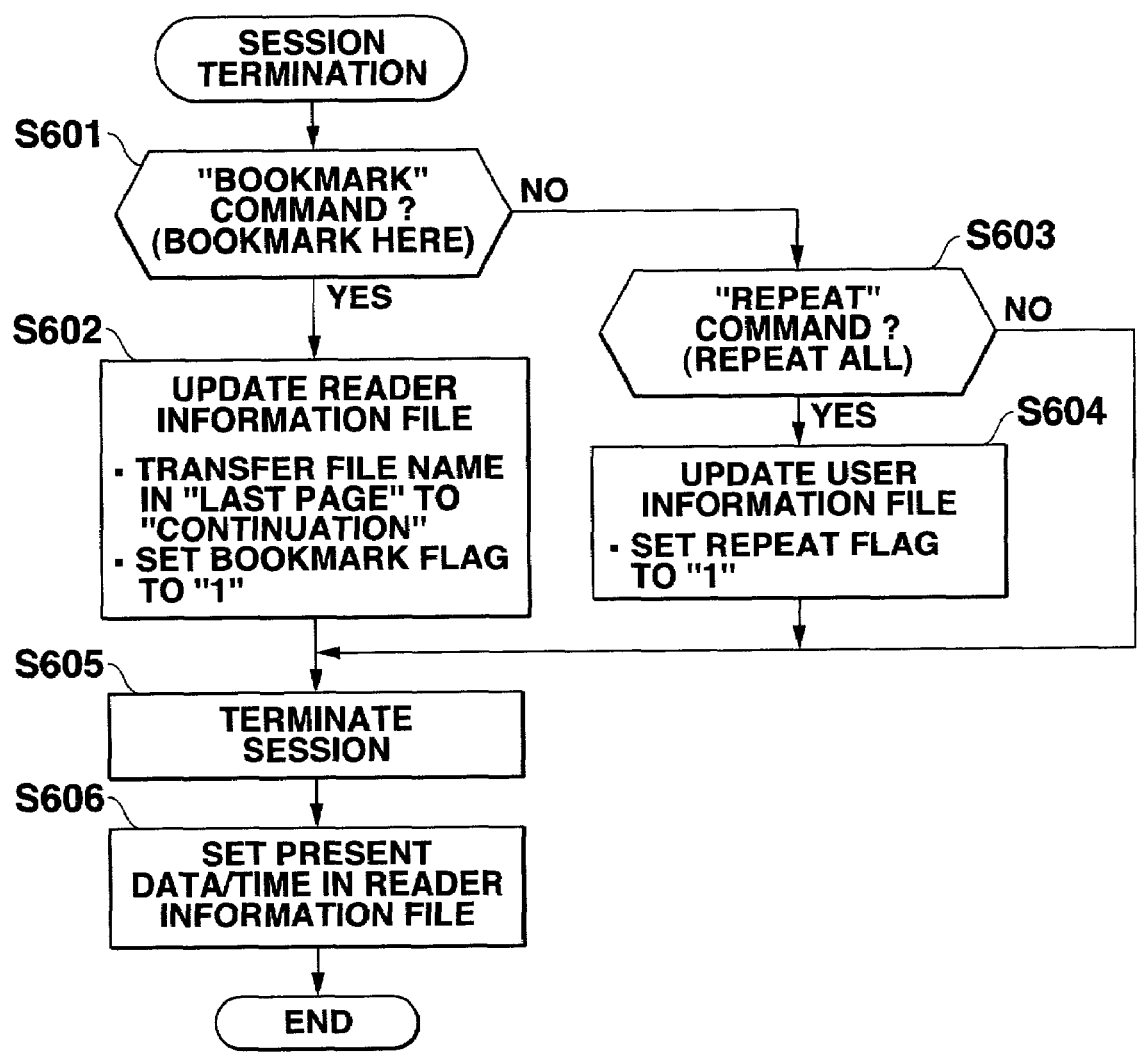
FIG. 9 is a flowchart for explaining the process for "session termination" carried out in the process flow shown in FIG. 4.

In a case where the received command is a command for requesting session termination (step S107: No), the process for "Session Termination" is carried out (step S600). The session termination process will now be described with reference to a flowchart shown in FIG. 9.

The command for requesting session termination (hereinafter, referred to as "command ST") is classified into "Bookmark" and "Repeat All". The provision progress managing unit 32 determines whether the received command ST is "Bookmark" or "Repeat All" (step S601).

Figure 12A:
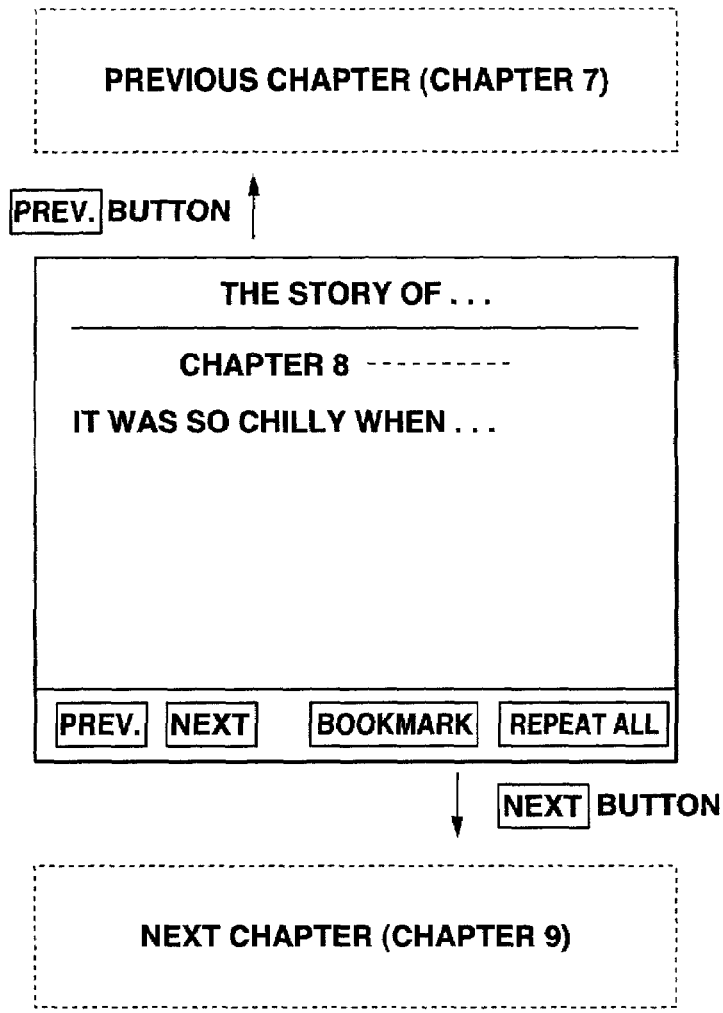
FIG. 12A is a diagram exemplifying a page transmitted during the process for "page designation"
Figure 12B:
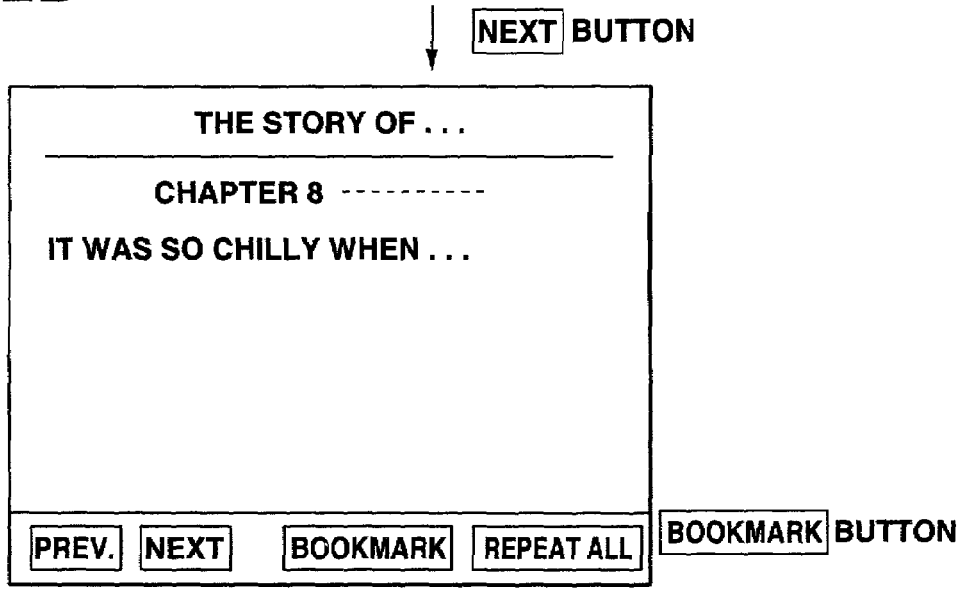
FIG. 12B is a diagram exemplifying a page transmitted during the process for "session termination".

See FIG. 12A or 12B exemplifying web pages displayed on the reader terminal 300. As illustrated, the web pages include "Bookmark" button. When the "Bookmark" button is clicked on by the user, the command "Bookmark" is transmitted to the story provider site 100. The web pages also include "Repeat All" button. In the same manner, upon clicking on the "Repeat All" button, the command "Repeat All" is transmitted. The command "Bookmark" represents that the reader intends to terminate the present session, and continue the reading next time (at the next session). On the other hand, the command "Repeat All" represents that the reader intends to terminate the present session, but read the story again from the beginning (chapter 1 or head page) next time (at the into session).

In a case where the received command ST is "Bookmark" (step S601: Yes), the provision progress managing unit 32 transfers the file name in "Last Page" of the reader information file to "Continuation Page", and sets the bookmark flag to "1" (step S602). Note that the provision progress managing unit 32 may set file name representing a web page following to the web page transmitted at the end of the last session to "Continuation Page", instead of the file name in "Last Page".

In a case where the received command ST is "Repeat All" (step S601: No), the provision progress managing unit 32 sets the repeat flag to "1" in the reader information file (step S604).

After the reader information file is thus updated (step S602 or S604), the web server 10 terminates the session with the reader terminal 300 concerned (step S605).

Upon terminating the session at step S605, the deadline managing unit 33 records the present date/time in "Session Termination" of the reader information file (step S606), and terminates the process.

Figure 10:
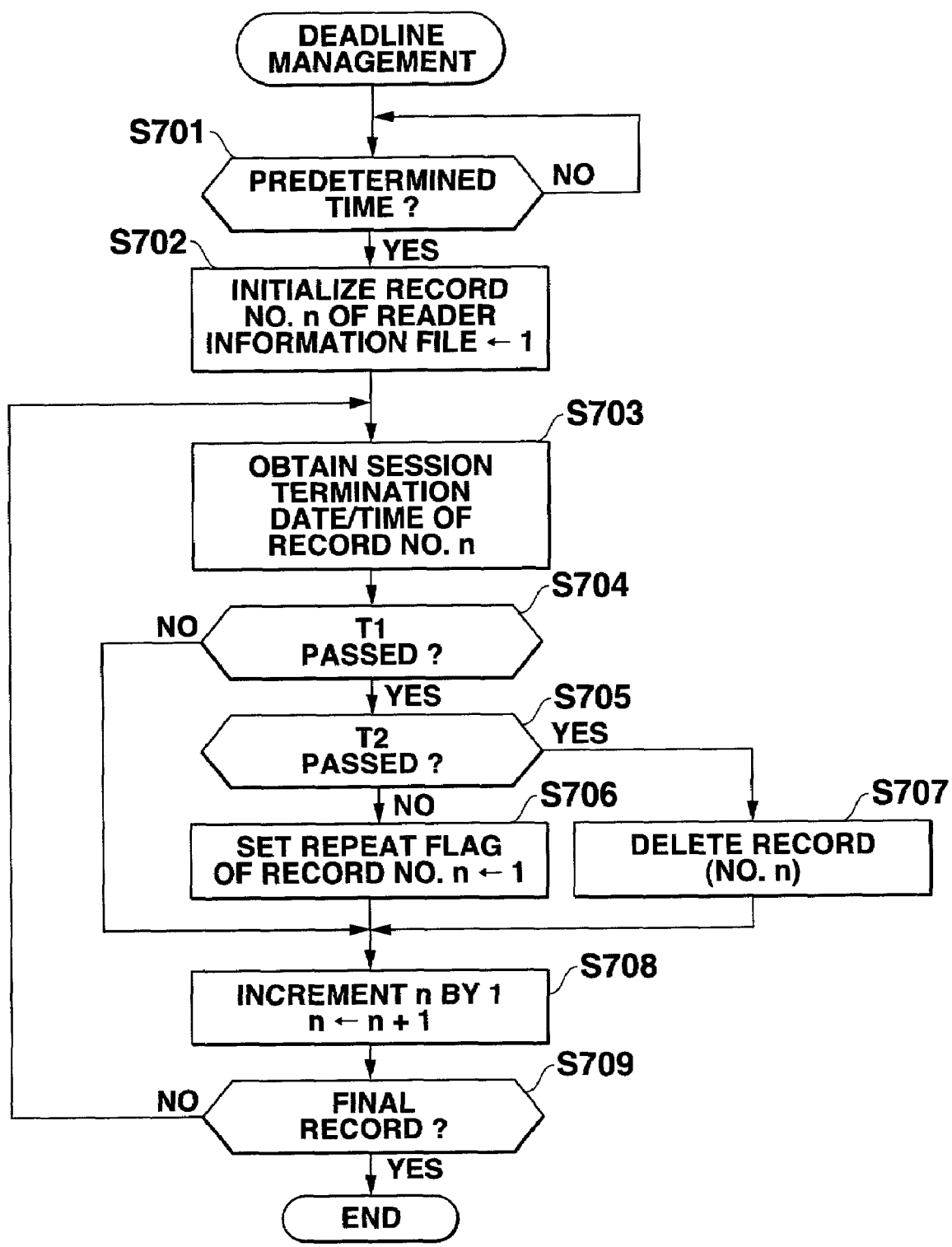
FIG. 10 is a flowchart for explaining the process for "deadline management" according to the embodiment of the present invention.

The process for "Deadline Management" carried out in the story providing system 1 according to the embodiment of the present invention will now be described with reference to a flowchart shown in FIG. 10.

In this embodiment, the deadline management process is carried out constantly at predetermined intervals (timings) (step S701).

The deadline managing unit 33 obtains information (date/time) in "Session Termination" from the first record (record No. 1) of the reader information file (steps S702 and S703).

The deadline managing unit 33 determines whether a first predetermined time period T1 (hereinafter, referred to as "time period T1") has lapsed since the date/time obtained at step S703 (step S704). The time period T1 may represent, for example, 1 month.

If it is determined at step S704 that the time period T1 has lapsed (step S704: Yes), the deadline managing unit 33 further determines whether a second predetermined time period T2 (hereinafter, referred to as "time period T2") has lapsed since the date/time obtained at step S703 (step S705). The time period T2 may represent, for example, 3 months.

If it is determined at step S705 that the time period T2 has not lapsed (step S705: No), the deadline managing unit 33 recognizes that the reader corresponding to the user ID for the record concerned has not accessed the story provider site 100 for over 1 month but within 3 months. Since the reader may forget which page was the last page, the deadline managing unit 33 sets the repeat flag to "1" in the record concerned (step S706) in order to provide the head page to the reader at the next session.

On the contrary, if it is determined at step S705 that the time period has lapsed (step S705: Yes), the deadline managing unit 33 recognizes that the reader concerned has not accessed the story provider site 100 for over 3 months. Since an assumption that the reader who has not accesses the story provider site 100 for such the long time will not accesses the story provider site 100 may be reasonable, the deadline managing unit 33 deletes the user ID stored in the record concerned and the user ID storage unit 20 (step S707).

The above "repeat flag setting" or "user ID deletion" is carried out for each record in the reader information file (step S708, S709: No). When the task for the final record is done (step S709: Yes), the deadline managing unit 33 terminates the process.

Though the story provider site 100 updates file names in "Last Page" and "Continuation Page" for identifying the page which was transmitted last time in the above described embodiment, such the update may be done by the reader terminal 300. In this case, the reader terminal 300 obtains file name of the final page at the end of the session, and transmits it to the story provider site 100 together with the command ST. The story provider site 100 will transmit the following page at the next session based on the file name provided by the reader terminal 300.

In the above described embodiment, the reader selects "Bookmark" or "Repeat All." at the end of the session, however, the story providing system 1 may allows the readers to select "Bookmark" or "Repeat All" at the beginning of the session. In this case, the story provider site 100 may transfer the lastly provided page at the beginning of a new session together with the "Repeat All" button. If the reader intends to continue the reading, he/she may just designate "Next" button, while designating "Repeat All" button if he/she intends to read the story again from the head page.

The above described embodiment has exemplified the document files written in HTML. However, any languages which are compatible with the data communications through the Internet are applicable to the present invention. For example, since languages such as WML (Wireless Markup Language) and compact HTML may be suitable for a case where the reader terminal 300 is an internet connectable mobile phone or the like, the story provider site 100 may create the document files written in such the languages. Moreover, the story may be distributed by e-mails, instead of the web page.

As for the deletion of user ID for the reader who has not accessed the story provider site 100 for a long time, the deadline managing unit 33 may remains the user ID stored in the user ID storage unit 20.

A general computer system is applicable to the story provider site 100 and the reader terminals 300, instead of the purpose specific system. Such the general computers may act as the story provider site 100 and the reader terminals 300 by, for example, installing programs for the above described processes from a recording medium (a flexible disk, a CD-ROM, or the like), or the like. In a case where the OS (Operating System) has necessary part for realizing the processes or collaborates with the application program(s) for realizing the processes, the recording medium may store only the program sets other than the OS.

The programs for realizing the process may be distributed via the telecommunications network. In this case, the program may be superimposed on a carrier wave signal. Such the program may be uploaded to the BBS (Bulletin Board System) or the like for the distribution.

Thus distributed programs may be invoked as well as the other application programs under control of the OS to realize the above processes.

According to the information providing system of the present invention, an information providing system prepares ID information (such as cookie) and additional information representing the last page and transmits them to a terminal used by a new comer user together with web page data. The terminal stores the given ID information, and transmits it when requesting pages. The information providing system updates the additional information so as to represent the last page provided in response to the request from the terminal. A page following to the page designated by the updated additional information or pages following to the page designated by the updated additional information will be provided to the terminal at the next session. Thus, the information providing system provides the user who continues the reading with the continuous pages. In other words, the information providing system memorizes which page the reader read the last time, and provides the continuous pages at the next session. According to this feature, the users are released from downloading unnecessary pages. It is helpful for reducing connection time and network traffic.

Moreover, the information providing system provides a user who has not accessed the information provider site over a predetermined time period (for example, 1 month) with a head page of the story again. According to this structure, it is able to provide the story providing service in consideration of the situation where such the users intend to forget which page was provided last time.

Furthermore, the information providing system deletes (cancels) user information and user ID for a user who has not accessed the information provider site for a longer time period (for example, 3 months), because it is reasonable that such the user will access the site no more. This structure is helpful for efficient use of storage for storing; user ID information. It is further suitable for a case where, for example, the documents are updated (changed) regularly or irregularly, because setting the deadline for using the service may promote the reading.

What is claimed is:

1. An information providing system which is connected to a communications network, and which individually provides web page data segments representing a plurality of pages which include successive description to respective individual user terminals at respective individual timings via the communications network, said system comprising:
   a web page storage unit which stores the web page data segments;
   an ID information managing unit which stores ID information corresponding to each of the user terminals and additional information corresponding to each of the user terminals, said additional information comprising information indicating a web page data segment most recently transmitted to the corresponding user terminal;
   a web page providing unit which, in response to designation of continuous provision by one of the user terminals, retrieves at least one web page data segment subsequent to the most recently transmitted web page data segment from the web page storage unit, based on the additional information stored in the ID information managing unit corresponding to the user terminal, and individually transmits the retrieved at least one web page data segment to the user terminal at an individual timing based on the ID information corresponding to the user terminal; and
   an additional information managing unit which, when the web page providing unit transmits the at least one web page data segment following the most recently transmitted web page data segment, updates the additional information corresponding to the user terminal to indicate a last transmitted web page data segment as the most recently transmitted web page data segment;
   wherein the additional information further comprises date/time information representing a date and time when the additional information was last updated; and
   wherein, if the designation of continuous provision by the user terminal is made after a predetermined time has elapsed after the date and time indicated by the date/time information, the at least one web page data segment transmitted to the user terminal comprises a plurality of sequential said web page data segments beginning at a head page of the web page data segments and extending to a web page data segment that is a predetermined number of web page data segments subsequent to the most recently transmitted web page data segment indicated by the additional information corresponding to the user terminal.

2. The system according to claim 1, wherein the web page storage unit stores file name data corresponding to the web page data segments, and the additional information includes file name data of the web page data segment; and
   wherein the web page providing unit, in response to a designation of repeat transmission from the user terminal, transmits at least a head page of the web page data segments based on the file name data in the additional information to the user terminal.

3. The system according to claim 1, wherein the web page providing unit deletes at least one of the ID information and the additional information corresponding to a user terminal, if the user terminal does not issue a request for the web page data segments for a predetermined time after the date and time indicated by the date/time information.

4. The system according to claim 1, wherein:
   the web page storage unit stores file name data corresponding to the web page data segments, and the additional information includes file name data of the web page data segment; and
   the web page providing unit, in response to a request from one of the user terminals for one of a next page and a previous page, retrieves a corresponding web page data segment from the web page storage unit based on the file name of the web page data segment, and transmits the retrieved web page data segment to the user terminal based on the corresponding ID information; and
   the additional information managing unit updates, in response to a designation of an end of reading by the user terminal, the additional information to indicate the most recently transmitted web page data segment, and stores the updated additional information.

5. An information providing method for individually providing web page data segments representing a plurality of pages including successive description from an information providing apparatus to a plurality of respective individual user terminals at respective individual timings, said method comprising:
   storing the web page data segments;
   storing ID information corresponding to each of the user terminals and additional information corresponding to each of the user terminals, said additional information comprising information indicating a web page data segment most recently transmitted to the corresponding user terminal;
   retrieving, in response to designation of continuous provision by one of the user terminals, at least one stored web page data segment subsequent to the most recently transmitted web page data segment, based on the stored additional information corresponding to the user terminal, and individually transmitting the retrieved at least one web page data segment to the user terminal at an individual timing based on the ID information corresponding to the user terminal; and
   updating, when the at least one web page data segment following the most recently transmitted web page data segment is transmitted, the additional information corresponding to the user terminal to indicate a last transmitted web page data segment as the most recently transmitted web page data segment;
   wherein the additional information further comprises date/time information representing a date and time when the additional information was last updated; and
   wherein, if the designation of continuous provision by the user terminal is made after a predetermined time has elapsed after the date and time indicated by the date/time information, the at least one web page data segment transmitted to the user terminal comprises a plurality of sequential said web page data segments beginning at a head page of the web page data segments and extending to a web page data segment that is a predetermined number of web page data segments subsequent to the most recently transmitted web page data segment indicated by the additional information corresponding to the user terminal.

6. The method according to claim 5, further comprising storing file name data of web page data corresponding to the web page data segments, said additional information including file name data of the web page data segment;
   wherein, in response to a designation of repeat transmission by the user terminal, at least a head page of the web page data segments is transmitted to the user terminal based on the file name data in the additional information.

7. The method according to claim 5, wherein at least one of stored the ID information and the stored additional information corresponding to a user terminal is deleted, if the user terminal does not issue a request for the web page data segments for a predetermined time after the date and time indicated by the date/time information.

8. An information providing system comprising:
an information providing apparatus connected to a communications network; and
a plurality of terminals each of which individually receives, at respective individual timings, web page data segments representing a plurality of pages including successive description from the apparatus via the communications network;
wherein each said terminal comprises:
a web page browser which receives the web page data segments and ID information for identifying the terminal from the information providing apparatus, and which outputs the received web page data segments; and
an additional information generator which generates additional information that designates a most recently outputted web page data segment outputted by the web page browser, and which transmits the generated additional information to the information providing apparatus together with the ID information when requesting at least one said web page data segment; and
wherein the information providing apparatus comprises:
a storage unit which stores the ID information and the additional information transmitted by the terminal in association with each other; and
a transmitter which, in response to a request for the at least one said web page data segment from one said user terminal, individually transmits at least one web page data segment subsequent to the most recently outputted web page data segment to the terminal designated by the ID information at an individual timing, based on the stored additional information corresponding to the user terminal;
wherein the additional information further comprises date/time information representing a date and time when the additional information was last updated; and
wherein, if a designation of continuous provision of the web page data segments is made by the user terminal after a predetermined time has elapsed after the date and time indicated by the date/time information, the at least one web page data segment transmitted to the user terminal comprises a plurality of sequential said web page data segments beginning at a head page of the web page data segments and extending to a web page data segment that is a predetermined number of web page data segments subsequent to the most recently transmitted web page data segment indicated by the additional information corresponding to the user terminal.

9. An information providing system for individually providing ordered web page data segments representing successive sections of a document to a respective individual user terminal at a respective individual timing via a communication network, the system comprising:
a web page storage section which stores the ordered web page data segments;
an ID information managing section which, when a request is received from the user terminal, (i) generates ID information to identify the user terminal if the user terminal is a new user terminal, (ii) generates additional information for tracking a web page data segment most recently transmitted to the user terminal, and (iii) stores the ID information in association with the additional information;
a web page providing section which retrieves at least one web page data segment designated by the new user terminal from the web page storage section, and which individually transmits the retrieved web page data segment to the user terminal at an individual timing together with the generated ID information;
a provision progress managing section which updates the additional information to identify a final web page data segment of the transmitted at least one web page data segment as the most recently transmitted web page data segment; and
an ID information receiving section which, when the user terminal is a returning user terminal, receives the ID information from the user terminal which was generated by the ID information managing section;
wherein when the user terminal is a returning user terminal and the request from the returning user terminal includes an instruction to retrieve at least one web page data segment following the most recently transmitted web page data segment, the web page providing section: accesses the stored additional information corresponding to the ID information received from the user terminal, retrieves the at least one web page data segment following the most recently transmitted web page data segment identified in the accessed additional information, and transmits the retrieved at least one web page data segment;
wherein the additional information further comprises date/time information representing a date and time when the additional information was last updated; and
wherein, if a designation of continuous provision of the web page data segments is made by the returning user terminal after a predetermined time has elapsed after the date and time indicated by the date/time information, the at least one web page data segment transmitted to the user terminal comprises a plurality of sequential said web page data segments beginning at a head page of the web page data segments and extending to a web page data segment that is a predetermined number of web page data segments subsequent to the most recently transmitted web page data segment indicated by the additional information corresponding to the user terminal.

10. An information providing system which is connected to a communications network, and which provides page data segments representing a plurality of pages which include successive description via the communication network, said system comprising:
a page data storage unit which stores the page data segments;
an ID information managing unit which generates: (i) ID information representing a requester in response to a request for page data transmission, and (ii) additional information corresponding to the requester indicating a page data segment most recently transmitted to the requestor and a date and time when the most recently transmitted page data segment was transmitted, and which stores the generated ID information and additional information;

a page providing unit which retrieves, from the page data storage unit, at least one page data segment in accordance with the page data segment indicated by the additional information, and which transmits the retrieved at least one page data segment to the requester together with the ID information representing the requester, wherein if the request for page data transmission is received a predetermined amount of time after the date and time indicated by the additional information, the at least one page data segment transmitted to the requester comprises a plurality of sequential said page data segments beginning at a head page of the page data segments and extending to a page data segment that is a predetermined number of web page data segments subsequent to the most recently transmitted page data segment indicated by the additional information; and a status managing unit which updates the additional information when a page data segment subsequent to the most recently transmitted page data segment is transmitted, and which cancels at least one of the additional information and the ID information corresponding to the requester if no request for page data transmission is received from the requester for a predetermined amount of time after the date and time indicated by the additional information.

* * * * *